(12) United States Patent
Wolf et al.

(10) Patent No.: US 9,660,303 B2
(45) Date of Patent: May 23, 2017

(54) BATTERY MONITORING SYSTEM

(75) Inventors: Michael Wolf, Ludwigsburg (DE);
Marcus Bremmer, Benningen Am Neckar (DE); Christoph Wenger, Korntal-Muenchingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1487 days.

(21) Appl. No.: 13/060,621

(22) PCT Filed: Jul. 1, 2009

(86) PCT No.: PCT/EP2009/058275
§ 371 (c)(1),
(2), (4) Date: May 27, 2011

(87) PCT Pub. No.: WO2010/022999
PCT Pub. Date: Mar. 4, 2010

(65) Prior Publication Data
US 2011/0313696 A1    Dec. 22, 2011

(30) Foreign Application Priority Data
Aug. 25, 2008    (DE) .................. 10 2008 041 518

(51) Int. Cl.
*G01R 31/36*    (2006.01)
*H01M 10/48*    (2006.01)
*H01M 10/06*    (2006.01)

(52) U.S. Cl.
CPC ......... *H01M 10/486* (2013.01); *H01M 10/48* (2013.01); *H01M 10/06* (2013.01); *Y02E 60/126* (2013.01); *Y10T 29/49117* (2015.01)

(58) Field of Classification Search
CPC .................................................. H01M 10/486
(Continued)

(56) References Cited

U.S. PATENT DOCUMENTS 5,773,962 A    6/1998    Nor
6,544,078 B2 *    4/2003    Palmisano et al. ........... 439/762
(Continued)

FOREIGN PATENT DOCUMENTS

DE    25 24 143    12/1976
DE    37 02 591    1/1987
(Continued)

OTHER PUBLICATIONS

International Search Report for PCT/EP2009/058275, dated Jan. 12, 2009.

*Primary Examiner* — Mischita Henson
*Assistant Examiner* — Eman Alkafawi
(74) *Attorney, Agent, or Firm* — Norton Rose Fulbright US LLP

(57) ABSTRACT

A battery monitoring device includes a sensor device, which is electrically connectable to an automobile battery and may be placed thereon, and which is arranged to detect an operating variable of the battery. The battery monitoring device further includes a detection circuit, which is connected via a cable connection to the sensor device; and a data processing circuit, which is connected via a potential isolation circuit to the detection circuit. The potential isolation circuit provides isolation of the potential level of the detection circuit from a potential level of the data processing circuit for direct components.

11 Claims, 1 Drawing Sheet

(58) Field of Classification Search
USPC .......................................................... 702/63
See application file for complete search history.

(56) References Cited

U.S. PATENT DOCUMENTS

| | | | | |
|---|---|---|---|---|
| 6,549,014 | B1* | 4/2003 | Kutkut et al. ................. | 324/426 |
| 7,876,071 | B2* | 1/2011 | Chen et al. .................... | 320/136 |
| 2010/0153039 | A1* | 6/2010 | Raichle et al. ................. | 702/63 |
| 2010/0161259 | A1* | 6/2010 | Kim et al. ...................... | 702/63 |
| 2010/0289499 | A1* | 11/2010 | Bremmer et al. ............ | 324/503 |

FOREIGN PATENT DOCUMENTS

| | | |
|---|---|---|
| DE | 37 22 415 | 1/1989 |
| DE | 102004003198 | 8/2005 |
| EP | 0 798 885 | 10/1997 |
| EP | 1 596 213 | 11/2005 |
| WO | WO 99/27628 | 6/1999 |

* cited by examiner

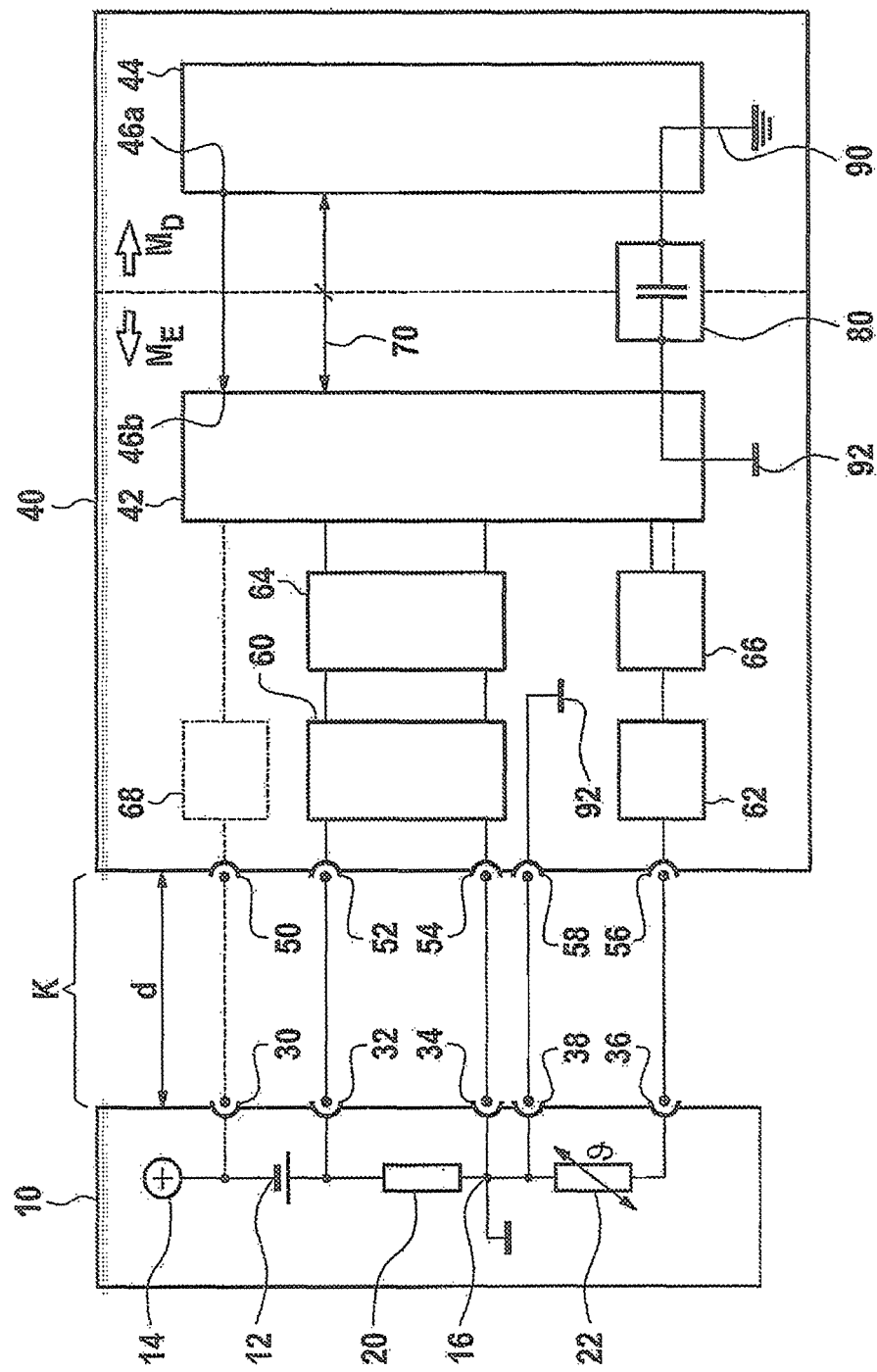

BATTERY MONITORING SYSTEM

FIELD OF THE INVENTION

The present invention is directed to devices for detecting the current, temperature, or voltage of a battery.

BACKGROUND INFORMATION

If the status of a battery, for example, a lead battery of a motor vehicle, is to be externally determined without intervention in the battery, the externally accessible variables of current, voltage, and temperature are engaged. These three variables are used as input variables for a method which ascertains the battery status therefrom employing data processing devices. For the current measurement, systems heretofore have used either shunt resistors or inductive current measuring principles, the analysis electronics and the current sensor being integrated into a mechanism. In the case of a lead battery of a motor vehicle, for example, having a current sensor, a voltage detector, a temperature detector, a signal processing and preprocessing unit, and a housing, the entire system is typically integrated into a pole recess of the battery, a terminal protruding from the entire system being electrically connected to the pole. In particular, if operating states are detected directly at the battery, it is necessary to provide the sensor on the battery; furthermore, it is typical to also attach the associated signal preprocessing unit there to prevent corruption due to long lines.

For example, if the current is to be measured using a shunt resistor, the shunt is to be provided directly on the battery to prevent line losses, and it is further typical to also provide a signal preprocessing unit directly on the shunt, in order to keep corruption due to voltage drops and due to voltages induced in the measuring lines as small as possible in the case of low currents, for example, of less than 1 ampere. In order to keep the overall size and the amount of waste heat small, shunt resistors are typically provided with very small resistance values, i.e., <1 ohm or 100 $\mu\Omega$ in the automotive field, for example, so that in the case of small currents, according to $U=R \times I$, also very small voltages of a few nV or $\mu V$, which reflect the current level, drop across the shunt resistor. Such small voltage values also occur in the case of temperature detection, since temperature sensors, as a function of the sensor type, also output signals which may easily be corrupted by long cable lengths and because of the low voltage level. In particular, it is to be noted here that in the case of use in an engine compartment of a motor vehicle, numerous interference sources act on the signal cable.

Therefore, conventional battery monitoring systems provide for attaching not only the sensors themselves, but rather also a preprocessing circuit or a detection circuit directly to the battery. The influence of interference sources is thus reduced by preprocessing directly at the sensor.

These systems have the disadvantage of a relatively complex mechanism which is capable of connecting electronic components and current-conducting conductors/sensors in such a way that sufficient corrosion protection and established protective classes, for example, IP5x5 or higher, are ensured, in particular in applications in the automotive field. Furthermore, it is necessary in the conventional system for electronics and signal processing components to be provided in the sensor unit, i.e., on the battery itself, such components typically already being provided in a higher-order control unit or data processing circuit, however, and also being able to be used. For this reason, the components provided for signal preprocessing are provided on the battery and in a higher-order data processing circuit on the basis of the conventional system architecture. Unnecessary costs therefore arise due to the duplicate design of the components.

Attaching a sensor element and a temperature measuring element in a housing of a sensor module, which is provided on the battery, is described in German Published Patent Application No. 102004003198. The sensor module does not contain active electronics, the entire analysis unit being provided in the calculation unit, which contains all further analysis components, i.e., in addition to a calculation unit, also a signal preprocessing unit. A shunt resistor having low resistance, for example, 100 $\mu\Omega$, is used for the current detection to measure currents between a few milliamperes and kiloamperes. Particularly simple components may be used if a shunt resistor is used as the current sensor element. However, in the above-mentioned document, signal lines, which are susceptible to interference, transmit signals between the sensor module and the combined calculation unit, which is located remotely therefrom. These lines transmit signals having a low level over a distance of up to 10 m in the engine compartment, the supply lines for the combined calculation unit also having to bridge several meters, whereby a ground offset between the negative pole of the battery, on the one hand, and the supply voltage of the calculation unit, on the other hand, results overall, which corrupts the measuring signals. In particular in the case of detection of small currents using a low-resistance shunt, the current intensities which are thus measured are substantially corrupted; this is also true for temperature measuring signals, which have a low voltage level. The system disclosed in German Published Patent Application No. 102004003198 explicitly uses a shared reference voltage source for a shared voltage supply of all components of the calculation unit. The error thus arising due to voltage offset because of the conduction of the supply line or through induced interfering signals, which result due to the different voltage potentials and the superindirect connection of the two supply grounds, is not discussed in this document.

SUMMARY

Example embodiments of the present invention provide a battery monitoring device and a corresponding method, using which operating variables of the battery may be engaged without providing additional signal preprocessing electronics directly on the battery, which would additionally require increased space, without thus introducing a measuring error or introducing additional interference signals in the wider range in the monitoring device.

Example embodiments of the present invention allow a measuring error in a battery monitoring device to be suppressed using simple components and without an additional space requirement. Example embodiments of the present invention only requires slight changes in conventional systems; a simple implementation in already existing systems thus results. Using example embodiments of the present invention it is possible to only provide the sensor elements themselves, i.e., for example, only passive components, on the battery, so that the small space requirement may be easily covered by a recess on the battery pole, as is typical in the case of lead batteries, for example. In particular, example embodiments of the present invention allow the use of shunts having low resistance, so that only insignificant heat development results even in the case of high currents. Simultaneously, in spite of the low shunt resistance and therefore the small signal amplitude of the current measuring signal, no additional errors are introduced by the transmission of the measuring signals; rather, example embodiments of the present invention allow the errors which result due to the use of long lines between the battery potential and the potential level of the power supply of the analysis circuits to be largely suppressed. Through the isolation of the potential of the data processing circuit from the detection circuit, which preprocesses the measuring signals of the sensor device, errors and interfering signals, which otherwise result due to the wiring arrangement of the supply line of the data processing circuit, are suppressed. The potential isolation circuit and its positioning isolates the potential level between the data processing circuit and the detection circuit, the data traffic provided between these circuits being relatively insensitive to a potential shift or to interfering signals. Only small relative errors also result in the case of an analog transmission between the detection circuit and the data processing circuit due to the high level which is used, even though strong interfering signals could result due to the wiring arrangement of the power supply of the data processing circuit or the detection circuit.

The battery monitoring device therefore includes a sensor device which is situated on a battery, preferably an automobile battery inside a motor vehicle engine compartment, and is electrically connected to the battery. The detection of several operating variables of the battery is thus ensured without an error being able to be introduced due to a spatial distance between the sensor device and the battery. In order to also use sensors in the sensor device which generate a low signal level, for example, shunt resistors, thermocouple elements, or also other sensors to which a small current is applied or which have a small sensitivity, a detection circuit is isolated from a data processing circuit via a potential isolation circuit. The signals which are generated by the sensor device are transmitted via a cable connection to the detection circuit. The detection circuit may thus be integrated with the data processing circuit, and the sensor device having a small space requirement may be implemented.

However, in order to prevent the above-mentioned measuring errors from occurring due to the cable connection, the detection circuit is first electrically coupled to the sensor device, and the detection circuit is connected via a potential isolation circuit to the data processing circuit, which further processes the signals which have been preprocessed by the detection circuit. The detection circuit typically preprocesses the signals of the sensor device by amplification and/or by analog/digital conversion, so that the preprocessed signals which are output from the detection circuit to the data processing circuit are significantly less susceptible to interference. Because of this, the potential isolation circuit which is incorporated between the data processing circuit and the detection circuit may introduce only a small error, if any at all; for example, during transmission in the form of digital signals between the detection circuit and the data processing circuit, a voltage offset does not cause any additional errors. Even if strong errors are introduced between the detection circuit and the data processing circuit, they may be easily compensated for in that the transmission is performed in a capacitive manner. It is to be noted here that such a capacitive decoupling is not possible in the case of the measuring signals as output by the sensor device, and the signal would be fundamentally changed. In particular if voltage, current, and temperature sensors which substantially output DC voltages are used, a capacitive isolation between the sensor device and the detection circuit is not possible.

The potential isolation circuit therefore preferably isolates the potential level of the power supply of the detection circuit, which corresponds to the potential level of the sensor device, from the potential level of the power supply of the data processing circuit. In the same manner, the potential levels may relate to the particular measuring inputs or outputs, some of which are identical to the potential of the voltage supply, depending on the circuit. The potential isolation circuit therefore isolates the data processing section of the monitoring device from the measuring and preprocessing section, which is provided by the sensor device and the detection circuit. In contrast to the isolation between the detection circuit and the sensor device which has been typical heretofore, the above-described measuring errors may thus be prevented.

In the simplest case, the potential isolation circuit is implemented as a serial capacitor; however, it may also be fundamentally implemented by any high-pass circuits; however, it must be ensured that in particular the direct components or alternating components below an established frequency are essentially not transmitted, while in contrast, alternating components above an established frequency are essentially preferably transmitted in order to dissipate AC voltages or currents, which are induced in the sensor device, in the cable connection, and/or in the detection circuit, into the power supply of the data processing circuit, and in order to dissipate alternating components which are generated in the data processing circuit into the ground of the detection circuit or the sensor device or into the ground of an onboard electrical network of the motor vehicle. It is to be noted in this case that a high-frequency coupling via the potential isolation circuit is therefore not critical, because the signals generated by the sensor device relate to variables which only change very slowly, i.e., essentially as a direct component. The useful component of the signals may therefore be isolated very easily from the interfering component by a low-pass filter. A DC voltage offset which is produced between the detection circuit and the data processing circuit simultaneously does not cause interference, since the offset relates to the particular supply voltage, which is typically regulated, and does not interfere with the operation of the particular components even in the event of deviations. It is to be noted in this case that in contrast thereto, a deviation in the case of measuring signals having a low level, a DC voltage offset has significant effects, since in particular the direct component of the measuring signals is to be detected, a DC voltage offset typically also being intercepted by a voltage regulator in voltage supply systems even in the case of large potential differences.

The potential isolation circuit is preferably provided between the ground of the detection circuit (or the sensor device) and the ground of the data processing circuit, preferably between the grounds of the particular voltage supplies or between the grounds of the voltage supply and the detection circuit and the ground of the analog or digital signal input of the data processing circuit, or between the measuring signal ground of the detection circuit and the measuring signal ground of the data processing circuit or the supply circuit of the data processing circuit.

Fundamentally, the positive poles, i.e., the supply voltage potential levels of the particular circuit parts, may also be isolated from one another by the potential isolation circuit, such an isolation correspondingly being provided between the circuit sections, as described above in the context of the ground isolation.

The data processing circuit and the detection circuit may be situated as a single assembly, the assembly being connected via the cable connection to the sensor device. The data processing circuit and the detection circuit are isolated from one another via the potential isolation circuit within the assembly, at least in regard to the direct component. In a similar manner, the data processing circuit and the detection circuit may be encompassed or enclosed by a shared housing and fastened therein. Electrical connection elements may be incorporated in the housing or fastened on the housing, the connection elements being connected to the detection circuit (and therefore also indirectly to the data processing circuit). The electrical connection elements are used for connecting the sensor device via the cable connection. In this case, the cable connection has the complementary connection elements, which may be electrically connected to the connection elements of the housing.

The potential isolation circuit is fundamentally used for isolating the direct components, in this context, direct components referring to the voltage components or potential components which are introduced by the above-described wiring between the potential level of the sensor device and the potential level of the supply voltages of the data processing circuit, and which only include frequencies below an established limiting frequency. The limiting frequency refers to the isolation between a direct component and an alternating component, this theoretically meaning a limit of 0 Hz, and practically isolating a range of greater than 0 Hz and at most 1 Hz, 5 Hz, or 10 Hz from a range above the particular upper limit. It is to be noted that the potential isolation circuit is further provided to transmit above a limiting frequency which separates direct components from alternating components, in order to suppress the influence of interfering signals by dissipation to ground. In particular at high frequencies, a potential isolation circuit which completely isolates the particular grounds from one another would produce two lines which are not grounded at one end, and which are susceptible in particular to induced interfering signals.

Fundamentally, the current, the temperature, or a potential or a voltage of the battery may be measured; in the case of the measurement of the terminal voltage of the battery, measuring signals having a low level may occur if an appropriate series resistor or an appropriate voltage divider is used. A shunt resistor or also magnetic sensors or Hall sensors or Hall resistors are suitable as the current sensor. Such current sensors are susceptible in particular to measuring errors as a result of potential offset as a function of the current and the type of sensor, so that example embodiments of the present invention are to isolate the potential as described in particular if these sensors are used.

In the same way, a semiconductor temperature sensor, an NTC resistor, a PTC resistor, or also a thermocouple element may be used as a temperature sensor. As a function of the wiring, such temperature sensors also produce signals having a low level, which are subject to substantial measuring errors without the interconnection described herein.

A tap of the battery positive pole may be used as the voltage sensor, or also a voltage divider or a series resistor which is connected to the positive pole. Depending on the size of the voltage divider and the series resistor, such small measuring signals may also be produced at typical battery voltages of 12, 24, or 48 V that they must be protected from interfering signal influences using the interconnection to prevent additional measuring errors.

If shunts of, for example, 1 $\mu\Omega$-1 $\Omega$, 10 $\mu\Omega$-10 m$\Omega$, 10 $\mu\Omega$-1 m$\Omega$, or approximately 100 $\mu\Omega$ are used, measurable voltages thus result in the nanovolt to microvolt range. Therefore, since slight voltage drops at the contact junctions or lines are also relevant, gold contacts are preferably used to form the cable connection, which are used, for example, for coating plug connections.

The battery monitoring device thus allows bridging of greater distances between the sensor device and the detection circuit, without a potential offset, which is introduced by the distance, resulting in measuring error problems. The sensor device and the detection circuit or the data processing circuit at a significant spatial distance may thus be provided, for example, within the engine compartment, cable connections having a length of at least 0.5 m, at least 1 m, at least 2 m, at least 5 m, or at least 10 m also hardly corrupting weak measuring signals due to the potential isolation circuit. Through this cable length, which is composed of the cable length between the sensor device and the automobile battery and the cable length between the automobile battery and the detection circuit or the data processing circuit or the joint assembly, both the sensor device and also the detection circuit or the data processing circuit or the joint assembly may be provided very flexibly within a vehicle. In spite of flexible or complex wiring, no substantial disadvantages result for the measuring signals detected by the sensor device because of the potential isolation circuit.

Example embodiments of the present invention may also be implemented by a corresponding method for the interference-free electrical coupling of a sensor device to a detection circuit, in which the individual components may be connected as described above. According to example embodiments of the present invention, the sensor device is therefore connected via the cable connection to the detection circuit, which also connects or integrates the data processing circuit with the detection circuit; however, a potential isolation circuit is provided between the particular potential levels (potential level of the detection circuit and potential level of the data processing circuit), which isolates the direct components between the two potential levels. The isolation is therefore provided in that a capacitance is interconnected between the two potential levels; the data processing circuit and the detection circuit may thus be situated in a joint assembly or integrated with one another, if the potential isolation circuit is provided for isolation. In the case of integration of the data processing circuit and the detection circuit in a shared housing, the detection circuit is preferably connected via connection elements and cable connections, which are situated outside the housing, to the sensor device. The connection is preferably provided via plug contacts, or via other connection elements, which may be implemented in parallel and as complementary at each corresponding interface. The method further preferably includes generating measuring signals by the sensor device, which may be implemented as described above. In order to measure the corresponding variable, the corresponding sensor is preferably situated directly on the battery; therefore, a temperature sensor is attached directly on the battery during the transmission to detect the temperature; a shunt resistor is attached directly to a pole of the battery to detect the current. The spatial isolation between the sensor device and the detection circuit/data processing circuit allows a high flexibility with respect to the positioning of the components and wiring.

Example embodiments of the present invention are fundamentally suitable for the connection and analysis of sensor devices which generate signals having a low level. Signals having a low level are, for example, signals in a voltage range of nanovolts, microvolts, or several millivolts, Example embodiments of the present invention being suitable in particular for sensor devices which deliver measuring voltages which differ maximally by only a small range, for example, by intervals in the nanovolt range, microvolt range, or millivolt range; signals having a low level are therefore also to be understood as voltage signals which possibly deliver a certain base voltage, but only vary slightly around this base value because of their function and their use, for example, in the case of sensors having lower sensitivity such as thermocouple elements.

Exemplary embodiments of the present invention are shown in the drawing and are explained in greater detail in the following description.

BRIEF DESCRIPTION OF THE DRAWING

FIG. 1 shows a battery monitoring device according to an example embodiment of the present invention in several variants having various sensors.

DETAILED DESCRIPTION

FIG. 1 shows a battery section 10 having a battery 12 and a positive pole terminal 14. A corresponding negative pole terminal 16 represents the ground of the potential level of the battery or the sensor device. The sensor device includes a shunt resistor 20 and an (optional) temperature sensor 22. Temperature sensor 22 is connected to negative pole terminal 16, so that the negative pole terminal may be used for both the shunt resistor and also for the temperature sensor, whereby one line may be saved. Battery unit 10 therefore includes a positive pole terminal 30, a tap 32, which is connected between the negative electrode of the battery and shunt resistor 20, and a negative pole tap 34, which mirrors the ground of battery unit 10, and a temperature sensor terminal 36.

In a first example embodiment, only one sensor, i.e., shunt resistor 20, is provided whereby terminals 30 and 36 are not necessary for detecting operating variables. A further embodiment only includes temperature sensor 22, as well as terminals 36 and 34, but not terminals 30 and 32. In a particularly preferred example embodiment, both temperature sensor 22 and also shunt resistor 20 are provided, both being able to be connected via terminal 34 to a further ground, and both sensors additionally also having a terminal, i.e., 32 or 36, whose potential in relation to terminal 34 specifies the particular operating variable, i.e., current and temperature. Current sensor 20 (shunt resistor) and temperature sensor 22 therefore share a common ground terminal 38.

A detection and data processing unit 40, which includes a detection circuit 42 and a data processing circuit 44, is connected to battery device 10, whose components are all provided in direct proximity to the battery. Detection circuit 42 is an analog circuit or an analog/digital circuit or a microcontroller, which detects and preprocesses measuring data. Unit 40, which may also be understood as an assembly, further has terminals 50-56, which are used for transmitting measuring signals of the sensor device. Terminal 50 is used for detecting the battery voltage or the positive pole potential of the battery, terminal 52 and terminal 54 are used for detecting the current by measuring the voltage which drops across shunt resistor 20, terminal 54 also being used together with terminal 56, terminal 56 being used for detecting the measuring signal of the temperature sensor. Furthermore, for example, the ground of battery unit 10 is connected via terminal 38 to the ground of detection circuit 42 via ground terminal 58 for shielding purposes or for interfering signal dissipation to ground. Within unit 40, ground terminal 58 is connected to the ground of the supply voltage of detection circuit 42. Additional input filters 60, 62 and overvoltage protection circuits 64, 66 are also interconnected between the individual terminals for receiving measuring signals 50-56 and the actual detection circuit. An optional overvoltage protection 68 for the connection of the voltage detection unit via terminal 50 may optionally be provided. It connects the positive pole of the battery to detection circuit 42. Fundamentally, filters and overvoltage protection circuits 60-68 may also be included with detection circuit 42.

Detection and data processing unit 40 further includes a data processing circuit 44, which, via a terminal 46a, supplies detection circuit 42 with a supply voltage via its supply voltage terminal 46b. Input 46b may also optionally be used as the voltage detection unit instead of terminal 50. In this case, connection 30-50 may be dispensed with. The connection between supply voltage output 46a and supply voltage input 46b may be direct and may represent an electrical connection. Furthermore, detection circuit 42 and data processing circuit 44 are connected to one another via a data transmission connection 70. This is preferably a serial or parallel data bus, on which digital data are exchanged (preferably from the detection circuit to the data processing circuit, or also in both directions). Connection 70 may be provided by a LIN bus, or by a simpler open collector circuit as the driver circuit. Fundamentally, analog signals may also be transmitted, which represent the particular measuring signal, if they were preprocessed by detection circuit 42 and have a significant voltage level in relation to the measuring signals of the sensor device. Fundamentally, however, digital connections are preferred, CAN protocols also being able to be used.

According to example embodiments of the present invention, potential level $M_E$ of the detection circuit is isolated from the potential level of data processing circuit $M_D$ along the dashed line shown in FIG. 1 in that the two ground potentials are connected to one another via potential isolation circuit 80 and are isolated for signals having a direct component. The ground of data processing circuit 90 is connected via a first wiring (not shown), for example, via the onboard electrical system to battery 12, the ground of data processing circuit 92 being connected via cable connection K between the terminals of detection circuit 40 and sensor device 14, 20, 22. In particular, detection circuit 42 receives a negative potential via terminal 58, which is directly electrically connected via cable connection K to terminal 38 of battery unit 10, which is in turn connected to negative pole terminal 16 of battery unit 10. In this manner, detection circuit 42 is supplied via the same cable connection K with ground, via which the sensor devices are also connected to the detection circuit. Therefore, cable connection K may differ from the wiring (not shown) which supplies data processing circuit 44 with ground. The flexibility thus achieved is purchased at the cost of a potential offset between the detection circuit and the data processing circuit which, however, is compensated for by potential isolation circuit 80 such that a voltage offset resulting between ground 90 and ground 92 is absorbed and made harmless by potential isolation circuit 80. The potential offset therefore has no effect on the measuring signals transmitted via cable connection K, since these are provided on the same ground potential level $M_E$ on which the detection circuit also operates (or with which the detection circuit is supplied). Potential isolation circuit 80 may be provided particularly simply as a serial capacitor or alternatively may be provided by multiple capacitors connected in parallel, which connect ground 92 to ground 90. Through this connection, further interferences are suppressed, which would otherwise be generated by two different sets of wiring, which are isolated from one another. A resistance, which results between pole terminal and housing, may be provided in parallel to the potential isolation circuit because of the wiring. The wiring between terminals 52/54 and 32/34 is preferably twisted. Overvoltage protection 64 is preferably connected via a differential $I_{sense}$ terminal of detection circuit 42. Connections preferably exist between overvoltage protection 66 and detection circuit 42, on the one hand, for the temperature voltage, which is transmitted via terminals, as well as a connection, which is shown by a dotted line, between overvoltage protection 66 and the supply voltage terminal of the analog part of detection circuit 42.

Detection and data processing unit 40 is preferably provided in a metal housing or plastic housing, which, via terminal 58, is electrically connected via ground terminal 38 to battery unit 10. Terminals 50-58 are preferably provided within a plug connection unit, which is incorporated in the housing of detection and data processing unit 40. In the same manner, terminals 30-38 are preferably provided as plug contacts, cable connection K preferably being provided to electrically contact the plug connections of terminals 50-58 using plug connections 30-38.

What is claimed is:

1. A battery monitoring device, comprising:
   a sensor device electrically connectable to an automobile battery and situated thereon, and adapted to detect an operating variable of the battery;
   a detection circuit connected via a cable connection to the sensor device; and
   a data processing circuit connected to the detection circuit via a potential isolation circuit, the potential isolation circuit isolating a potential level of the detection circuit and a potential level of the data processing circuit for direct signal components from one another, wherein the potential isolation circuit is located outside of the sensor device.

2. The battery monitoring device according to claim 1, wherein the potential isolation circuit includes at least one of (a) a capacitor and (b) a high-pass filter connected in series between the potential levels, and at least one of (a) the potential isolation circuit connects a supply voltage potential level of the detection circuit in series to a supply voltage potential level of the data processing circuit and (b) the potential isolation circuit connects a ground potential level of the detection circuit in series to a ground potential level of the data processing circuit.

3. The battery monitoring device according to claim 1, wherein at least one of (a) the data processing circuit and the detection circuit are arranged as a single assembly connected via the cable connection to the sensor device and (b) the data processing circuit and the detection circuit are enclosed by a shared housing having electrical connection elements connected inside the housing to the detection circuit and is connected via the cable connection situated outside the housing to the sensor device.

4. The battery monitoring device according to claim 1, wherein the operating variable is a current delivered by the automobile battery or flowing thereto, a temperature of the battery, a potential of the battery, or a voltage applied to the battery, and the sensor device includes at least one of the following sensors: a current sensor adapted to detect the current, a temperature sensor adapted to detect the temperature, and a voltage sensor adapted to detect the potential or the voltage of the battery; and the current sensor is a shunt resistor, which connects a battery negative pole to a ground-onboard electrical system terminal or connects a battery positive pole to a supply potential onboard electrical system terminal, or the current sensor is a magnetic sensor or Hall sensor, which detects the strength of a magnetic field which is generated by the current; the temperature sensor is a semiconductor temperature sensor, an NTC resistor, or a PCT resistor, which is in heat-transfer contact with the battery, in order to detect its operating temperature; and the voltage sensor includes a tap, which is electrically connected to the battery positive pole directly, via a voltage divider, or via a series resistor.

5. The battery monitoring device according to claim 1, wherein the sensor device is situated directly on the battery, and the detection circuit is connected to the sensor device via plug connections and a cable having a length of at least one of (a) at least 0.5 m, (b) at least 1 m, (c) at least 2 m, (d) at least 5 m, and (e) at least 10 m.

6. A method for an interference-free electrical coupling of a sensor device, which detects operating variables of an automobile battery and is situated on the battery, to a detection circuit, and a data processing circuit, including:
   connecting the sensor device to the detection circuit, which is situated remotely therefrom, via a cable connection;
   connecting the data processing circuit to the detection circuit by connecting a potential level of the detection circuit to a potential level of the data processing circuit for alternating signal components; and
   isolating the potential level of the detection circuit from the potential level of the data processing circuit for direct signal components using a potential isolation circuit, which is incorporated between the potential levels connected in series, wherein the potential isolation circuit is located outside of the sensor device.

7. The method according to claim 6, wherein the potential levels are separated from one another using a capacitor connected in series between the potential levels or using a plurality of parallel capacitors connected between the potential levels, the potential levels each being supply voltage potential levels or ground potential levels of at least one of (a) the detection circuit and (b) the data processing circuit.

8. The method according to claim 6, further comprising:
   at least one of (a) situating the data processing circuit and the detection circuit in a single assembly connected to the sensor device via the cable connection and (b) fastening the data processing circuit and the detection circuit in a shared housing, which has electrical connection elements;
   connecting the connection elements within the housing to the detection circuit; and
   connecting the connection elements outside the housing by attaching the externally situated cable connection to the sensor device and to the connection elements.

9. The method according to claim 6, wherein a current delivered by the automobile battery or flowing thereto, a temperature of the battery, a potential of the battery, or a voltage applied to the battery is measured as the operating variable using sensor devices, and the detection of the operating variables is performed using a current sensor, a temperature sensor, or a voltage sensor; the current sensor is a shunt resistor, which controls the current to be detected, and which connects a battery negative pole to a ground-onboard electrical system terminal or which connects a battery positive pole to a supply potential-onboard electrical system terminal; the current sensor is a magnetic sensor or Hall sensor, which is situated in a magnetic field, which is generated by the current; the temperature sensor is a semiconductor temperature sensor, an NTC resistor, or a PCT resistor, which is brought into heat-transfer contact with the battery, in order to detect its operating temperature; and the voltage sensor includes a tap, which is electrically connected to a battery positive pole directly, via a voltage divider, or via a series resistor.

10. The method according to claim 6, wherein the sensor device is situated directly on the battery, and the detection circuit is connected to the sensor device via plug connections and a cable having a length of at least one of (a) at least 0.5 m, (b) at least 1 m, (c) at least 2 m, (d) at least 5 m, and (e) at least 10 m, and the detection circuit is situated spatially isolated from the sensor device.

11. The battery monitoring device according to claim 1, wherein the potential isolation circuit connects the potential level of the detection circuit and the potential level of the data processing circuit for alternating signal components.

* * * * *